Patented Jan. 19, 1943

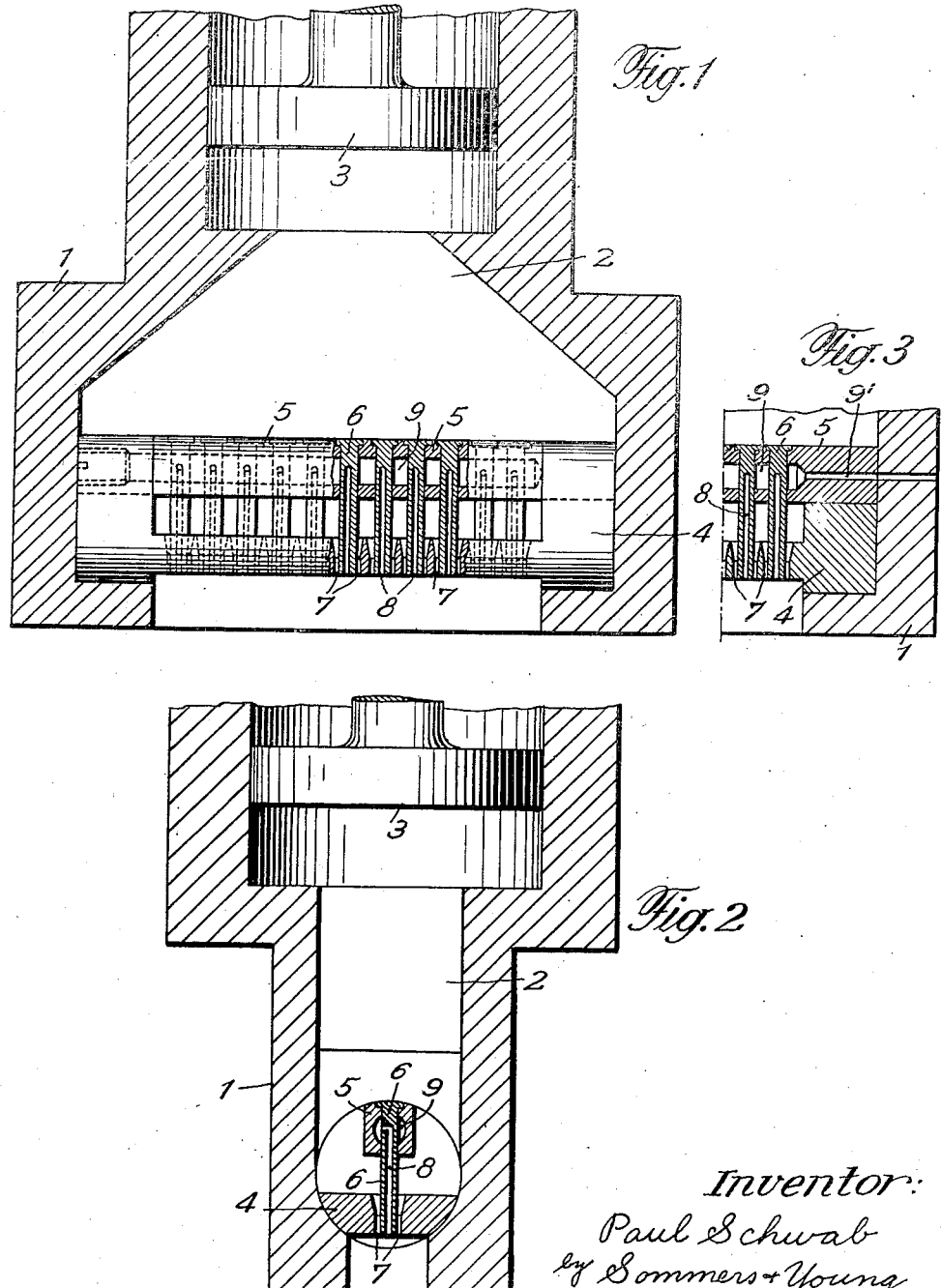

2,308,937

UNITED STATES PATENT OFFICE 2,308,937

EXTRUSION DIE FOR HOLLOW FOOD PASTE ARTICLES

Paul Schwab, Niederuzwil, Switzerland, assignor to Gebrüder Bühler, Uzwil, Switzerland Application September 9, 1940, Serial No. 356,073
In Switzerland September 11, 1939

2 Claims. (Cl. 107—14)

This invention relates to extrusion dies for hollow food paste articles.

The extrusion dies hitherto known for the production of hollow food paste articles are provided with solid pins for the formation of the hollow space interiorly of the paste articles. If certain individual strands of paste articles, for example macaroni, discharging from the press are pressed flat during the following working operations for example, in suspending the strands astride from rods for drying them, the air has no longer access to the hollow interior of these strands, so that said strands are further flattened by pressure action of the ambient air, whereby flat food paste articles are formed instead of hollow ones.

The object of the present invention is to eliminate this drawback in that in the extrusion die according to the invention the pins for the formation of the hollow spaces are each provided with a bore which communicates with the hollow space of the respective strand and with a passage in common with all these bores.

Even if with this arrangement part of the hollow food paste articles delivered by the press is pressed flat during the following working operations these articles, which are flattened at occasional points, are nevertheless accessible to the air via the remaining hollow food paste articles, the pins and the common passage. By this means the flattened paste articles are exposed to equal atmospheric air pressure from within and without and can no longer be pressed flat by pressure action of the ambient air.

An embodiment of the invention is illustrated by way of example only in the accompanying drawing, in which Fig. 1 shows a vertical section of an extrusion die according to the invention;

Fig. 2 shows a vertical section taken through said die at right angles to the picture plane of Fig. 1, and Fig. 3 is a view of a modified detail of Fig. 1.

The numeral 1 designates a portion of the casing of a food paste article press, the hollow interior 2 of this portion being filled with food paste or dough which is maintained under a certain pressure by a piston 3 or other suitable compression means. In the casing portion 1 an extrusion die member 4 is inserted on which a carrier bar 5 is arranged. In the bar 5 pins 6 are inserted which project into perforations 7 in the die member 4 and have the function to form the hollow space in the food paste articles, for example macaroni, passing thereover in discharging from the press.

Each pin 6 is provided with a bore 8 which communicates with the hollow space of the food paste articles passing over the respective pin and with a passage 9 in common with all said pin bores, said passage being formed by the hollow interior, that is, a bore of the carrier bar 5.

Even if with this arrangement individual strands of food paste articles delivered by the press are pressed flat during the following working operations, for example in suspending the strands astride from drier rods, these articles, which are flattened at occasional points, are nevertheless accessible to the air via the remaining hollow food paste articles, the bores 8 of the pins 6, and the common passage 9. By this means the flattened paste articles are exposed to equal air pressure from within and without and can no longer be pressed flat by pressure action of the ambient air.

Fig. 3 shows a modified extrusion die according to the invention in which the passage 9 in common with the bores 8 of all the pins 6 is directly placed in communication with the ambient air through a branch duct 9' extending through the casing 1 at a point opposite to one of the ends of the passage 9. By this means air can be directly supplied to those strands of food paste material that have been flattened after their delivery from the press. These flattened strands are thus supplied with air independently of the remaining strands not being accidentally throttled by flattened portions.

Instead of one row of perforations 7 several such rows may be provided in the die member 4, each row being associated with a separate carrier bar 5. In this arrangement the passages 9 of the various bars 5 may communicate with each other in order to ensure positive access of air to the hollow spaces interiorly of the food paste.

What I claim is:

1. In an extrusion die for hollow food paste articles, the combination with a perforated die member, of bored pins each projecting with its outer bored end into one of said perforations of said die member for forming a hollow interiorly of the strand of food paste articles extruded thereover through the respective perforation, a carrier member for said pins associated with said die member and holding said pins at their inner ends in position relative to said perforations, said carrier member forming a closed collecting space for atmospheric air surrounding said inner pin ends, and communication means interconnecting said space and said bores at said inner pin ends, for said space to automatically mediate the transfer of atmospheric air through any of said bores into the associated hollows, that may happen to be shut from direct communication with the atmosphere, commensurate with collecting atmospheric air through the remaining hollows.

2. In an extrusion die for hollow food paste articles, the combination of a die pressure chamber, a perforated die member, walls closing off from the pressure chamber, an air collecting space therein, and bored pins each projecting with its outer bored end into one of the perforations of the die member for forming hollows interiorly of the strands of food paste articles extruded thereover through the respective perforations, the bores of said pins being connected with said air space, whereby in operation the air space and bores of said pins supply air to the hollows in the paste articles under the influence of suction generated by the forward movement of any collapsed strands to compensate the tendency of atmospheric air pressure to collapse the strands.

PAUL SCHWAB.